US008831352B2

(12) United States Patent
Gao et al.

(10) Patent No.: US 8,831,352 B2
(45) Date of Patent: Sep. 9, 2014

(54) EVENT DETERMINATION FROM PHOTOS

(75) Inventors: Mingyan Gao, Irvine, CA (US);
Xian-Sheng Hua, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 13/079,592

(22) Filed: Apr. 4, 2011

(65) Prior Publication Data

US 2012/0251011 A1  Oct. 4, 2012

(51) Int. Cl.
G06K 9/46 (2006.01)
G06K 9/00 (2006.01)
G06F 17/30 (2006.01)

(52) U.S. Cl.
CPC ...... *G06F 17/30265* (2013.01); *G06K 9/00671* (2013.01)
USPC ........... 382/190; 382/228; 382/286; 382/305; 382/115; 382/118; 715/735; 701/1

(58) Field of Classification Search
CPC . G06K 9/00523; G06K 9/20; G06F 17/30256
USPC ................. 382/190, 228, 286, 305, 115, 118; 715/735; 701/1
See application file for complete search history.

(56) References Cited

U.S. PATENT DOCUMENTS

| | | | | |
|---|---|---|---|---|
| 8,069,169 | B2* | 11/2011 | Fitzpatrick et al. | 707/732 |
| 2004/0135904 | A1* | 7/2004 | Shiota et al. | 348/231.99 |
| 2006/0080286 | A1* | 4/2006 | Svendsen | 707/3 |
| 2007/0005571 | A1* | 1/2007 | Brewer et al. | 707/3 |
| 2008/0046320 | A1 | 2/2008 | Farkas et al. | |
| 2008/0174676 | A1 | 7/2008 | Squilla et al. | |
| 2009/0049004 | A1* | 2/2009 | Nurminen et al. | 707/1 |
| 2009/0319472 | A1 | 12/2009 | Jain et al. | |
| 2010/0111428 | A1* | 5/2010 | Yu et al. | 382/228 |
| 2011/0099478 | A1* | 4/2011 | Gallagher et al. | 715/735 |

OTHER PUBLICATIONS

Allan et al., "Detections, bounds, and timelines: Umass and tdt-3", In Proceedings of Topic Detection and Tracking Workshop (TDT-3), Vienna, VA, 2000, retrieved at <<http://maroo.cs.umass.edu/pdf/IR-201.pdf>>, 7 pages.

Berners-Lee et al., "The semantic web", Scientific American Magazine, May 2001, pp. 35-43.

Burges et al., "Learning to Rank using Gradient Descent", In Proceedings of the 22nd International Conference on Machine Learning, Bonn, Germany, 2005, retrieved at <<http://www.machinelearning.org/proceedings/icml2005/papers/012_LearningToRank_BurgesEtAl.pdf>>, 8 pages.

(Continued)

*Primary Examiner* — Mike Rahmjoo
(74) *Attorney, Agent, or Firm* — Micky Minhas; Lee & Hayes, PLLC

(57) ABSTRACT

Events may be determined based on an image and context data associated with the image. An event type associated with the image may be determined based on a concept of the image. A list of events may be retrieved from an event database based on the context data. The retrieved list of events may then be ranked based on the determined event type and the context data. Through this event determination, a user may obtain information of one or more events happening at a specific location simply by capturing an image of that specific location, thereby saving the user from searching and browsing the Internet or brochure to locate the information of the one or more events at the specific location.

20 Claims, 4 Drawing Sheets

(56) References Cited

OTHER PUBLICATIONS

Cataldi et al., "Emerging topic detection on twitter based on temporal and social terms evaluation", In MDMKDD '10: Proceedings of the Tenth International Workshop on Multimedia Data Mining, New York, NY, USA, 2010. ACM, pp. 1-10.

Chen et al., "Event Detection from Flickr Data through Wavelet-based Spatial Analysis", CIKM'09, Nov. 2-6, 2006, Hong Kong, China, retrieved at <<http://www.l3s.de/web/upload/documents/1/cikm0651-chen.pdf>>, 10 pages.

Davis et al., "From Context to Content: Leveraging Context to Infer Media Metadata", MIM'04, Oct. 10-16, 2004, New York, NY, retrieved at <<http://luci.ics.uci.edu/predeployment/websiteContent/weAreLuci/biographies/faculty/djp3/LocalCopy/pdf_63900590-3243-4FA0-845E4BF832AA8BCC.pdf>>, 8 pages.

Freund et al., "An efficient boosting algorithm for combining preferences", Journal of Machine Learning Research 4, 2003, retrieved at <<http://www.ai.mit.edu/projects/jmlr/papers/volume4/freund03a/freund03a.pdf>>, pp. 933-969.

Guha et al., "Semantic Search", WWW '2003, May 20-24, 2003, Budapest, Hungary, retrieved at <<http://courses.ischool.utexas.edu/~i385t-sw/readings/Guha_McCool-2003-Semantic_Search.pdf>>, pp. 700-709.

Hall "Correlation-based Feature Selection for Discrete and Numeric Class Machine Learning", In ICML '00: Proceedings of the Seventeenth International Conference on Machine Learning (2000), retrieved at <<http://www.cs.odu.edu/~mukka/cs795sum10dm/Lecturenotes/Day4/10.1.1.148.6025%5B1%5D.pdf>>, pp. 359-366.

Hare et al., "Mind the Gap: Another look at the problem of the semantic gap in image retrieval", Proc. SPIE, Multimedia Content Analysis, Management, and Retrieval, Jan. 17, 2006, retrieved at <<http://citeseerx.ist.psu.edu/viewdoc/download?doi=10.1.1.106.3954&rep=rep1&type=pdf>>, 12 pages.

Horrocks et al., "SWRL: A Semantic Web Rule Language Combining OWL and RuleML", retrieved on Dec. 29, 2010, at <<http://www.daml.org/2004/04/swrl/>>, pp. 1-30.

Jansen et al., "Determining the user intent of web search engine queries", WWW 2007 / Poster Paper, May 8-12, 2007, Banff, Alberta, Canada, retrieved at <<http://www.ra.ethz.ch/CDstore/www2007/www2007.org/posters/poster989.pdf>>, pp. 1149-1150.

Koolwaaij et al., "Context Watcher—Sharing context information in everyday life", Proceedings of the IASTED, the Int. Conf. on Web Technologies, Applications, and Services (WTAS'06), 2006, retrieved at <<http://www.lab.telin.nl/~koolwaaaij/research/Pub/koolwaaij.2006.3.pdf>>, 10 pages.

Lowe "Object Recognition from Local Scale-Invariant Features", Proc. of the International Conference on Computer Vision, Corfu, Sep. 1999, retrieved at <<http://www.cs.ucla.edu/~soatto/vision/courses/269/papers/LowelCCV99.pdf>>, pp. 1-8.

Malatack et al., "WhisperMobile: A Mobile System for Capturing, Sharing, and Finding Social Events", Mobile HCI'07, Sep. 11-14, 2007, Singapore. retrieved at <<http://www.cs.cmu.edu/~jasonh/publications/mobilehci2007-mobilewhisper-submitted.pdf>>, 4 pages.

Naaman "Eyes on the World", Yahoo! Research Berkeley, Oct. 2006, Computer, retrieved at <<http://infolab.stanford.edu/~mor/research/naamanComp06.pdf>>, pp. 108-111.

Petrovic et al., "Streaming first story detection with application to twitter", Proceedings of NAACL, Jun. 2010, retrieved at <<http://homepages.inf.ed.ac.uk/miles/papers/naacl10a.pdf>>, 9 pages.

Prud'hommeaux et al., "SPARQL Query Language for RDF", Technical report, W3C, 2006, retrieved on Feb. 9, 2011, at <<http://www.w3.org/TR/2006/WD-rdf-sparql-query-20061004/>>, 1 page.

Quinlan "C4.5: programs for machine learning", Morgan Kaufmann Publishers Inc., San Francisco, CA, USA, 1993, 307 pages.

Rattenbury et al., "Towards Automatic Extraction of Event and Place Semantics from Flickr Tags", SIGIR'07, Jul. 23-27, 2007, Amsterdam, The Netherlands, retrieved at <<http://infolab.stanford.edu/~mor/research/sigir2007rattenburyTagSemantics.pdf>>, 8 pages.

Rose et al., "Understanding User Goals in Web Search", WWW'2004, May 17-22, 2004, New York, NY, retrieved at <<http://www.ra.ethz.ch/CDstore/www2004/docs/1p13.pdf>>, pp. 13-19.

Sakaki et al., "Earthquake shakes twitter users: real-time event detection by social sensors", WWW'2010, Apr. 26-30, 2010, Raleigh, North Carolina, retrieved at <<http://ymatsuo.com/papers/www2010.pdf>>, 10 pages.

Smeulders et al., "Content-based image retrieval at the end of the early years", IEEE Transactions on pattern Analysis and Machine Intelligence, vol. 22, No. 12, Dec. 2000, retrieved at <<http://www.sc.ehu.es/ccwgrrom/transparencias/articulos-alumnos-doct-2002/igor-olaizola/00895972.pdf>>, pp. 1349-1380.

Trier et al., "Feature extraction methods for character recognition-a survey", Pattern Recognition, vol. 29, No. 4, Elsevier Science ltd, (c) 1996, Great Britain, retrieved at <<http://www.cs.sfu.ca/fas-info/cs/CC/414/li/material/refs/OCR-survey-96.pdf>>, pp. 641-662.

Westermann et al., "Toward a common event model for multimedia applications", IEEE Computer Society, 2007, retrieved at <<http://www.ics.uci.edu/~srafatir/misc/exam%20files/pdf/Toward%20a%20Common%20Event%20Model%20for%20Multimedia%20Applications.pdf>>, pp. 19-29.

Yang et al., "A study of retrospective and on-line event detection", SIGIR'98, Melbourne, Australia, (c) 1998, retrieved at <<http://www.icst.pku.edu.cn/course/TextMining/07-08Spring/%E5%8F%82%E8%80%83%E6%96%87%E7%8C%AE/06-02%20A%20study%20on%20 restrospective%20and%20on-line%20event%20detection.pdf>>, 9 pages.

Zha et al., "Video concept detection using support vector machines—TRECVID 2007 evaluations", Microsoft Research, Redmond, Washingon, 2007, retrieved at <<http://research.microsoft.com/pubs/70534/tr-2008-10.pdf>>, 11 pages.

Zhao et al., "Narrowing the semantic gap—improved text-based web document retrieval using visual features", IEEE Transactions on Multimedia, vol. 4, No. 2, Jun. 2002, retrieved at <<http://www.cs.sunysb.edu/~rzhao/publications/TransMultimedia.pdf>>, pp. 189-200.

* cited by examiner

EVENT DETERMINATION FROM PHOTOS

BACKGROUND

Nowadays, more and more people travel to different places and across countries for family vacation and/or business trips. Other than going to popular sightseeing spots, a visitor may want to attend events that are scheduled to occur in a city he/she is visiting. However, the visitor may not know what events are scheduled to occur unless he/she plans beforehand to find out what events are going on in that city by, for example, checking with local people and/or browsing a tourist attraction website (if available) for events. Thus, if the visitor happens upon an event that is currently ongoing, the visitor may not know what the event is, particularly if the visitor is not familiar with the local customs. Additionally, the visitor may not readily be able to learn the nature of the event if, for example, the visitor cannot speak the local language.

SUMMARY

This summary introduces simplified concepts of event determination, which is further described below in the Detailed Description. This summary is not intended to identify essential features of the claimed subject matter, nor is it intended for use in limiting the scope of the claimed subject matter.

This application describes example embodiments of event determination. In one embodiment, an image and context data associated with the image are received. The context data may include, for example, spatial information and temporal information associated with the image. In one embodiment, the spatial information may include a location at which the image was captured. In another embodiment, the spatial information may include a location of a point of focus shown in the image. In one embodiment, the temporal information may include a date and/or time at which the image was captured. In some embodiments, the time may be for an event occurring in substantially real time (e.g., about to start, ongoing, or just finished).

The context data may be compared with an event database to retrieve a first list of events (e.g., events scheduled to occur in the general vicinity of the image at approximately the same time the image was captured and/or emergent events that occur impromptu). The image may be analyzed to determine an event type (e.g., sports, concert, speech, etc.) of an event which is shown in the image. Event types of the events in the first list may be compared with the determined event type to obtain a second list of events, which may be presented to a user as potential events that could be shown in the image.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
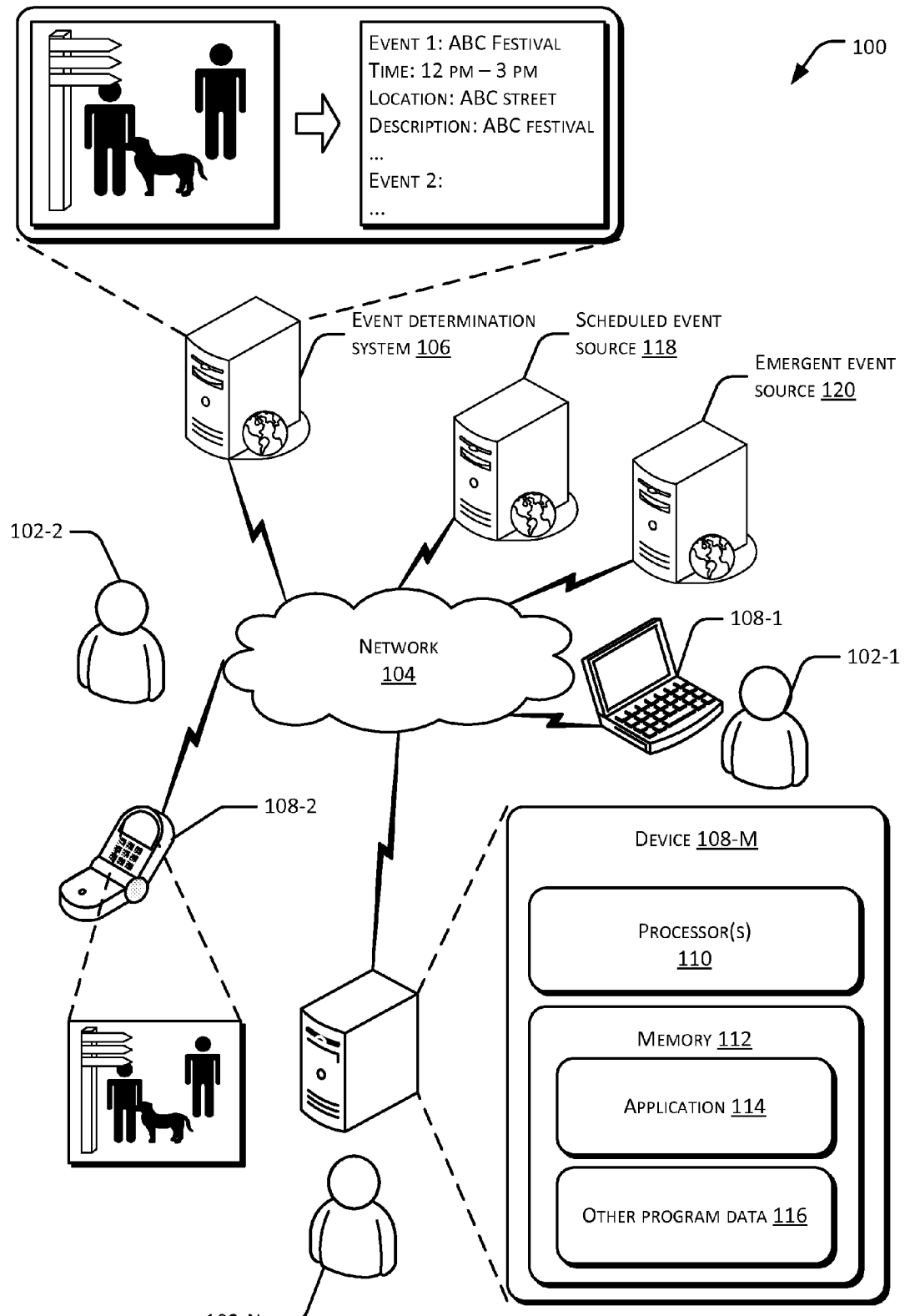
FIG. 1 illustrates an exemplary environment including an example event determination system.

As noted above, a visitor travelling to a city may not be aware of any events happening in the city, even though an event such as a dancing performance or a festival is about to happen, is currently ongoing, or just happened around the visitor. For example, a visitor to New York City may wander near Union Square on a Saturday morning. Certain events may be going on in Union Square. However, if the visitor cannot speak English, for example, the visitor will not be able to ask other people whether there is any event in or near Union Square or the nature of the event.

Furthermore, even if the visitor may be aware of an event happening in Union Square, he/she may not know what exactly the event is and what schedule the event may have. The visitor may need to obtain a brochure or the like to determine what the event and its schedule are, assuming that a right brochure for the event exists. Most of the time, the visitor may give up trying to determine the event due to an amount of time he/she may need to spend to determine the event and uncertainty of whether he/she will be interested in the event. Therefore, the visitor may miss out an event that would have been interesting to the visitor.

This disclosure describes an event determination system, which determines an event and/or a nature of the event without requiring a user to know ahead of time what the event is.

Generally, a user may use a client device to obtain information of a scene in which an event is happening. By way of example and not limitation, an event may include planned or scheduled events which are pre-scheduled ahead of time (e.g., musicals, sporting events, festivals, etc.), and emergent events which occur impromptu (e.g., car accidents, earthquakes, etc). In one embodiment, the user may use, for example, a (still or video) camera of the client device, to capture an image of the scene in which the event is happening. In response to receiving an indication that the user points an image capture device (e.g., the camera of the client device) to a scene in which an event is happening, the client device or an application of the client device may automatically capture an image of the scene without the user having to physically snap an image of the scene. In other embodiments, the client device or the application may capture the image of the scene in response to a prompt from the user.

Additionally or alternatively, the user may move the client device to obtain various scenes of the happening event at different directions of view and/or degrees of zooming. In response to moving the client device by the user, the client device or the application may capture the various scenes of the event continuously or in regular intervals.

In either case, in response to capturing the image of the scene, the client device or the application of the client device may transmit the image to an event determination system. If the client device or the application of the client device is used to capture various scenes of an event, the application may transmit images of the various scenes of the event either continuously or at predetermined time intervals to the event determination system.

In one embodiment, the client device or the application of the client device may further transmit context data associated with the image. In some embodiments, the context data may include spatial information associated with the image. By way of example and not limitation, the spatial information may include a location at which the image was captured by the client device or the application of the client device. In one embodiment, the location may be determined based on a Global Positioning System (GPS) included in the client device, based on the client device's location in a cellular network (e.g., based on a cell tower to which the client device is connecting), based on connection to WiFi or other wireless networks, or the like.

Additionally or alternatively, the spatial information may include information of the location provided by the user. For instance, the user may provide an estimate of the location to the client device or the application of the client device by inputting, for example, a name of a building in a city and/or an intersection of two streets or roads.

Additionally or alternatively, the spatial information may include location information that is captured in the image. For example, the user may use the client device to capture an image including a name of a building, a signpost of a street and/or a recognized object indicating a specific location, e.g., Union Station.

In one embodiment, the context data may further include temporal information associated with the image. By way of example and not limitation, the temporal information may include a date and/or time at which the image was captured by the client device or the application of the client device.

Additionally or alternatively, the temporal information may include a time, a time range, a date or a date range that is inputted by the user of the client device. For example, the user may use the client device to capture a specific location, e.g., Union Square while the user may be positioned locally at or remotely from the specific location. The user may want to determine whether any event was, is, or will be held at the specific location captured by the client device. The user may input a time, a time range, a date or a date range which the user wants to know whether an event was, is, or will be held at that specific location. Specifically, the user may determine what event was, is, or will be held at a specific location (e.g., a building such as Union Square) simply by capturing an image of the specific location and inputting a time, a time range, a date or a date range which the user wants to know.

In one embodiment, the user may transmit a query including an image and/or context data associated with the image to the event determination system. In response to receiving the image and/or the context data as the query from the client device or the application of the client device, the event determination system may determine an event shown in the image. In one embodiment, the event determination system may determine whether context data associated with the image is present in the query. If so, the event determination system may determine that the context data includes spatial information and/or temporal information associated with the image.

In other embodiments, the event determination system may determine that context data is absent from the query. In response to determining that context data is absent from the query, i.e., only the image is received from the client device, the event determination system may render the date and/or time at which the system receives the image to be a date and/or time (i.e., temporal information) associated with the image. Furthermore, the event determination system may perform object recognition to estimate or infer a location (i.e., spatial information) from the image. By way of example and not limitation, the image may include a name of building such as Union Square or a well-known object such as Eiffel Tower. Based on a result of the object recognition, the event determination system may then estimate or infer a location associated with the image.

Additionally or alternatively, the event determination system may determine the location associated with the image by determining the client device's location in a cellular network (e.g., based on a cell tower to which the client device is connecting), based on connection to WiFi or other wireless networks, or the like.

In some embodiments, the event determination system may receive context data associated with the image, which may include only spatial information or temporal information associated with the image. In either case, the event determination system may either infer a location from the image and/or render the date and/or time of receipt of the image as a date and/or time associated with the image respectively.

In response to determining the spatial information and the temporal information associated with the image, the event determination system may retrieve a list of events from an event database based on the spatial information associated with the image. In some embodiments, the events in the retrieved list may include events that occur within a predetermined distance from a location indicated in the spatial information. In one embodiment, the events included in the retrieved list may include scheduled events that are pre-scheduled to occur at the location indicated in the spatial information. Additionally or alternatively, the events in the retrieved list may include emergent events that occur impromptu.

In some embodiments, the event database may obtain scheduled events and/or emergent events prior to receiving the query from the client device. Additionally or alternatively, the event database may obtain scheduled events and/or emergent events substantially in real time after receiving the query from the client device. In one embodiment, the event database may obtain the scheduled events by crawling and extracting event information from hosting websites (e.g., museum websites), informational websites (e.g., tour attraction websites), etc. Additionally, the event database may obtain scheduled events from various integrating websites such as websites that collect events in a local area and/or various areas in a country and/or across countries.

In one embodiment, the event database may further obtain emergent events by examining and extracting information from a variety of social networking sources. Examples of informational sources include, but are not limited to, websites posting blogs or micro-blogs (e.g., Twitter®, etc.), social networking sites (e.g., Facebook®, etc.), RSS feed, etc. The event database may examine information discussed and posted in one or more of these social networking sources and determine whether an emergent event occurs at a particular location at a particular time or period of time. The event database may then store information of a determined emergent event in the database.

In addition to retrieving a list of events based on the spatial information associated with the image, the event determination system may retrieve the list of events based further on the temporal information associated with the image. In one embodiment, the event determination system may retrieve events that further occur within a predetermined time range before or after a time or a time range indicated in the temporal information.

In one embodiment, the event determination system may determine whether a time, a time range, a date or a date range indicated in the temporal information refers to a time in the past (e.g., 1 hour ago, 1 day ago), a present time (e.g., within a predetermined time range from the current time such as within 5 minutes from the current time) or a time in the future (e.g., 1 hour later, 1 day later, etc.). In response to determining the time indicated in the temporal information, the event determination system may retrieve events that occur within a predetermined time range of the time, time range, date or date range indicated in the temporal information.

Additionally or alternatively, the event determination system may perform content analysis of the image to determine a concept in the image. By way of example and not limitation, a concept may include, but is not limited to, an action shown in the image (e.g., dancing and music performance), an object (e.g., an actor and a building), and/or a background scene (e.g., a lake and a landscape), etc. The event determination system may extract image features from the image and determine a concept in the image based on the extracted features.

In one embodiment, in response to determining a concept in the image, the event determination system may determine an event type (e.g., sports, concert, speech, etc.) of the event shown in the image based on the concept. The event determination system may compare the determined event type with the events in the retrieved list of events, for example, from the event database, to obtain a refined list of events. For example, the event determination system may retain the events of the retrieved list in the refined list and place a first event in the refined list of events in a higher ranking position than a second event in response to determining that an event type of the first event matches the determined event type while an event type of the second event does not.

Additionally or alternatively, the event determination system may include details of an event whose event type matches the determined event type in the refined list of events and a brief description of an event whose event type does not match the determined event type. For example, details of an event may include, but are not limited to, a name of the event, a description of the event, a schedule of the event, a location of the event, and/or a web link associated with the event for further information, etc. A brief description of an event may include a subset of the details of the events such as a name of the event and/or a web link associated with the event. Alternatively, the event determination system may return only events having an event type matching the determined event type in the refined list of events.

Upon obtaining the refined list of events or information of a single matched event, the event determination system may send the refined list of events or the information of the single matched event to the client device. In one embodiment, the event determination system may send the refined list or the information of the single matched event to the client device in a form of a text message, an email, an audio message and/or a web page.

In response to receiving the refined list of events or the information of the single matched event from the event determination system, the client device or the application of the client device may display the refined list of events or the information of the single matched event on a display of the client device. Alternatively, the client device may play the audio message if present to the user through, for example, a speaker. In some embodiments, the client device or the application of the client device may augment the information of the refined list of events or the single matched event on the image. For example, the client device might overlay details or other information of the event(s) on a display or view finder of a camera of the client device.

Additionally, the user may further move the client device to capture a new image of another scene of the same event from a different direction and/or a different degree of zooming. The client device or the application of the client device may transmit the new image to the event determination system with or without context data of the new image.

In response to receiving the new image with or without context data of the new image, the event determination system may refine the prior refined list of events based on the received new image with or without context data of the new image. In one embodiment, the event determination system may retain events that match the received new image with or without context data of the image and adjust rankings of the retained events based on the received new image and the context data of the image (if present). In another embodiment, the event determination system may retrieve a new list of events based on the received new image and the context data of the received new image (if present) and compare the new list with the prior refined list to obtain events that are present in both lists. The event determination system may then provide the list of common events to the client device. In one embodiment, the common events may be ranked according to corresponding ranking order in the new list, corresponding ranking order in the prior refined list, or a weighted combination of corresponding ranking orders in the new list and the prior refined list.

The described system allows for automatic determination of an event without user knowledge of the event in advance. In some embodiments, the described system allows a user to determine an event and corresponding schedule simply by transmitting an image of a scene in which the event is happening, and determines the event and its information for the user substantially in real time. The event that can be determined by the described system may be a past event, a current event or a future event. In the case of future events, the image would not be of the event itself, but rather an image of a location at which the event will happen at a scheduled time in the future.

Multiple and varied implementations and embodiments are described below. In the following section, an exemplary environment that is suitable for practicing various implementations is described. After this discussion, illustrative implementations of systems, devices, and processes for an event determination system are described.

Exemplary Architecture

FIG. 1 illustrates an exemplary environment 100 usable to implement an event determination system. The environment 100 includes one or more users 102-1, 102-2, . . . 102-N (which are collectively referred to as 102), a network 104 and an event determination system 106. The user 102 may communicate with the event determination system 106 through the network 104 using one or more client devices 108-1, 108-2, . . . 108-M, which are collectively referred to as 108.

The client devices 108 may be implemented as any of a variety of conventional computing devices including, for example, a personal computer, a notebook or portable computer, a handheld device, a netbook, an Internet appliance, a portable reading device, an electronic book reader device, a tablet or slate computer, a television, a set-top box, a game console, a mobile device (e.g., a mobile phone, a personal digital assistant, a smart phone, etc.), a media player, etc. or a combination thereof.

The network 104 may be a wireless or a wired network, or a combination thereof. The network 104 may be a collection of individual networks interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

In one embodiment, the client device 108 includes a processor 110 coupled to memory 112. The memory 112 includes an application 114 and other program data 116. The memory 112 may be coupled to or associated with, and/or accessible to other devices, such as network servers, router, and/or other client devices 108.

In one embodiment, the user 102 may use the application 114 of the client device 108 to capture an image showing an event and/or context data associated with the event or the image, and send the image and/or the context data to the event determination system 106. In some embodiments, the application 114 may capture the image without requiring the user 102 to actually snap an image using, for example, a camera of the client device 108 (e.g., the image may be captured by simply pointing the viewfinder at the event). Additionally or alternatively, the user 102 may move the client device 108 to capture the event from a different view such as a different direction or a different zooming degree. Additionally or alternatively, the user may use the application 114 to capture images of the event continuously or on a regular basis, e.g., every 5 seconds.

In response to receiving a query including the image and/or the context data from the client device 108, the event determination system 106 may retrieve and determine one or more events that are relevant to the event shown in the image from an event database (not shown) and return information of the one or more events to the client device 108 for display on a display (not shown).

In one embodiment, the environment 100 may further include a scheduled event source 118 and an emergent event source 120. The scheduled event source 118 may include, but is not limited to, informational websites such as tour attraction websites, hosting websites such as websites of organizations that host events, event websites such as websites which collect events in one or more areas, etc. The emergent event source 120 may include, but is not limited to, blog websites (such as Twitter®, for example), a social networking sites (e.g., Facebook®, etc.), and/or RSS feeds, etc.

Figure 2:
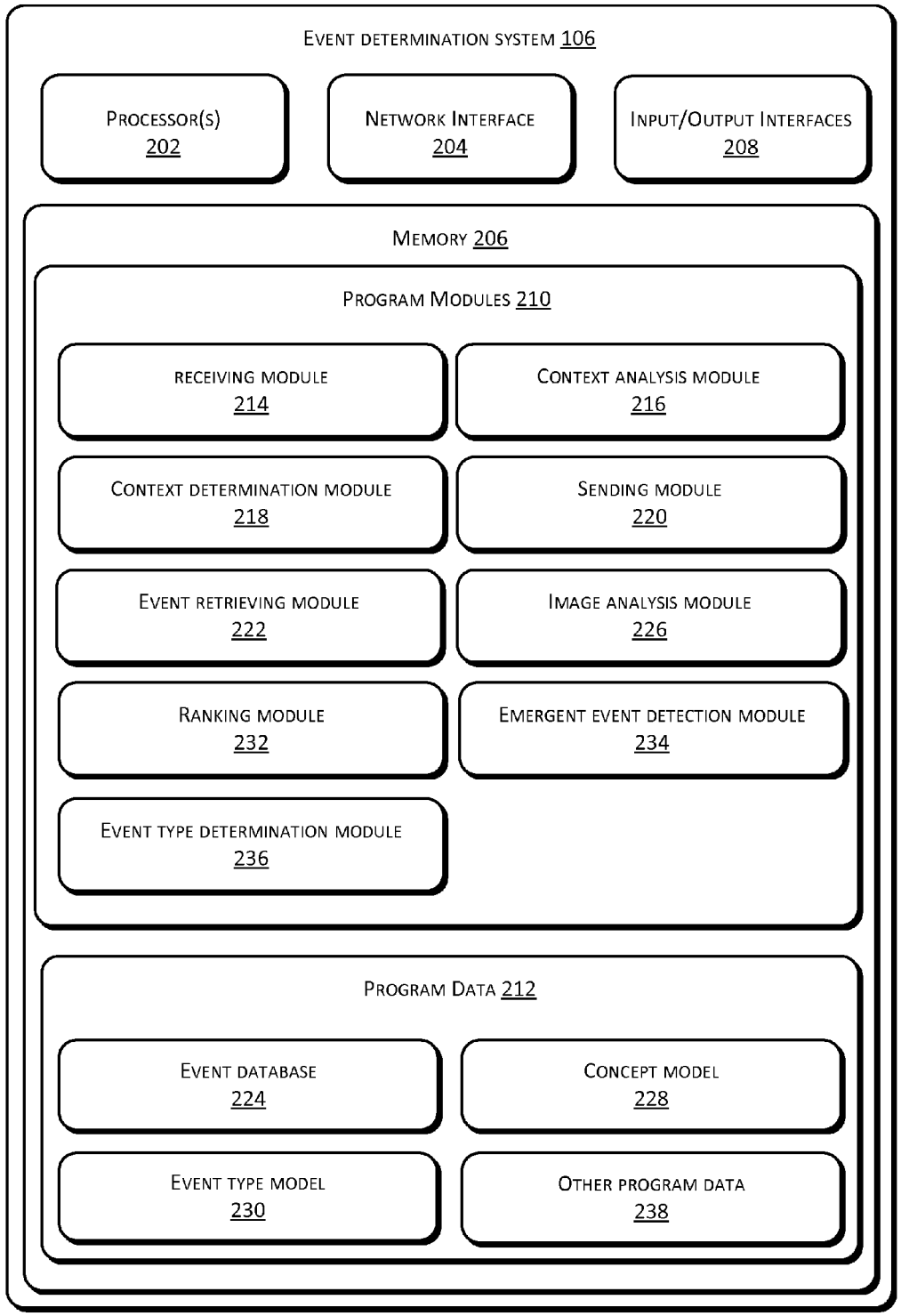
FIG. 2 illustrates the example event determination system of FIG. 1 in more detail.

FIG. 2 illustrates the event determination system 106 in more detail. In one embodiment, the system 106 can include, but is not limited to, one or more processors 202, a network interface 204, memory 206, and an input/output interface 208.

The memory 206 may include computer-readable media in the form of volatile memory, such as Random Access Memory (RAM) and/or non-volatile memory, such as read only memory (ROM) or flash RAM. The memory 206 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 206 may include program modules 210 and program data 212. In one embodiment, the program modules 210 may include an input module 214 which may receive an image from the client device 108. Additionally, the input module 214 may further receive context data associated with the image or an event shown in the image. In one embodiment, the context data associated with the image or the event shown in the image may include spatial information of the image or the event shown in the image. By way of example and not limitation, the spatial information may include a location at which the image was captured. For example the client device 108 may include a GPS system and may send GPS data along with the image to the event determination system 106. Alternatively, the spatial information may include an estimate of a location inputted by the user 102. The estimate of the location may include, for example, a name of a building, an intersection between two streets, etc.

Additionally or alternatively, the context data associated with the image or the event shown in the image may further include temporal information of the image or the event shown in the image. In one embodiment, the temporal information may include, for example, a date and/or time at which the image was captured. Alternatively, the temporal information may include a time, a time range, a date or a date range inputted by the user 102.

In one embodiment, in response to receiving the image, the receiving module 214 may determine whether context data associated with the image or the event shown in the image is present. Depending on whether the context data is present, the receiving module 214 may transmit the image and/or the context data to a context analysis module 216 or a context determination module 218.

If the context data is not present or only one of spatial information or temporal information is present, the receiving module 214 may transmit the image to the context analysis module 216. For example, if spatial information is not present, the context analysis module 216 may analyze the image to determine a location of the image. In one embodiment, the context analysis module 216 may perform object recognition to determine if an object (e.g., a building such as Eiffel Tower) exists in the image. The context analysis module 216 may then extract the object and perform an image search using the extracted object, for example, through an image search engine, which may be separate from or included in the event determination system 106. In response to recognizing an object in the image, the context analysis module 216 may determine a location associated with the image based on the recognized object. For example, the context analysis module 216 may determine that a building shown in the image is the Eiffel Tower and may determine that a location associated with the image is Champ de Mars in Paris, France.

Additionally or alternatively, the context analysis module 216 may determine that text is shown in the image (e.g., a street sigh, a building name, etc.) using optical character recognition (OCR) or other known text recognition techniques. The context analysis module 216 may then perform a textual search using, for example, a search engine which may or may not be included in the event determination system 106. Based on a search result of the textual search, the context analysis module 216 may determine a location associated with the image.

Additionally or alternatively, the context analysis module 216 may determine or estimate spatial information (e.g., a location) associated with the image by examining spatial information of the client device 108 in a cellular network (e.g., based on a cell tower to which the client device 108 is connecting), based on connection of the client device 108 to WiFi or other wireless networks, or the like.

In one embodiment, in response to determining or estimating spatial information associated with the image, the context analysis module 216 may send the determined spatial information to the client device 108 for display to the user 102 through a sending module 220. By way of example and not limitation, the sending module 220 may send the spatial information determined by the context analysis module 216 to the client device 108 in a form of a text message, an email, an audio message, etc. Furthermore, the determined spatial information may be represented as a textual representation (e.g., a textual name of a building, a textual name of a street, etc.), a graphical representation (e.g., a local or street map indicating the determined spatial information or location), and/or an audio representation (e.g., a recorded message), etc. The user 102 may confirm, reject or modify the determined spatial information through, for example, the application 114 of the client device 108, and return a confirmation, rejection or modification to the event determination system 106. In response to receiving a confirmation or a modification from the client device 108, the context analysis module 216 may determine the spatial information associated with the image based on the confirmed or modified spatial information or location.

If the context analysis module 216 fails to determine spatial information associated with the image or receives a rejection from the client device 108, the context analysis module 216 may send a message to the client device 108 through the sending module 220 to request that the user 102 inputs a location of the image and/or activates a GPS system (if available) of the client device 108.

Additionally or alternatively, if the temporal information is not present, the context analysis module 216 may render the current time of receiving the image to be a time associated with the image or the event shown in the image. In response to determining the spatial information (i.e., a location) and/or the temporal information (i.e., a date and/or time) associated with the image or the event shown in the image, the context analysis module 216 may transmit the spatial information and/or the temporal information to the context determination module 218.

In one embodiment, the context determination module 218 may determine whether a time, a time range, a date or a data range indicated in the temporal information refers to a time in the past (e.g., 1 day ago, 1 hour ago, etc.), a time at present (e.g., within a predetermined time range from the present time such as 5 minutes ago) or a time in the future (e.g., 1 hour from now, 1 day from now, etc.).

In one embodiment, in response to determining that the time indicated in the temporal information refers to a time in the past or a time in the future, the context determination module 218 may determine that the image itself may not include any information of an event of interest to the user 102 and may return a list of events to the user 102 based on the context data alone (i.e., without analyzing the image content).

Alternatively, the context determination module 218 may still determine whether the image includes an event of interest based on how far the time indicated in the temporal information is from the current time. By way of example and not limitation, the context determination module 218 may determine that the date and time indicated in the temporal information is within a predetermined time difference from the current date and time, e.g., 1 hour later than the current time. In that case, the context determination module 218 may determine that the image may include information of an event that will be held at that particular location associated with the image. For example, the event may be a festival and the image may include food stalls, a banner, etc., though the event has not yet begun.

In response to determining the context data associated with the image, the context determination module 218 may send the context data such as the spatial information and the temporal information to an event retrieving module 222. The event retrieving module 222 may retrieve a list of events from an event database 224. In one embodiment, the event database 224 may include planned or scheduled events (which are pre-scheduled beforehand (e.g., sporting events, festivals, etc.). The event database 224 may obtain these planned or scheduled events from a variety of sources. Examples of this variety of sources include informational websites such as tour attraction websites, hosting websites such as websites of organizations that host the events, event websites such as websites that collect events in one or more areas, etc. The event database 224 may further crawl or extract information of the planned events by performing a search on a search engine, for example.

In some embodiments, the event database 224 may further include emergent events. The emergent events may include events which occurrences are unplanned and/or impromptu. Examples of these emergent events may include car accidents, earthquakes, etc. In one embodiment, the event database 224 may discover and obtain information of emergent events by crawling and analyzing blogs or micro-blogs in one or more blog websites (such as Twitter®), social networking sites (e.g., Facebook®, etc.), and/or RSS feeds, etc.

The information of a planned event and/or an emergent event may include, but is not limited to, a title of the event, a location of the event, a time and date (or time/date range) of the event, a description of the event, a web link associated with the event, and/or one or more images associated with the event or a similar event in the past, etc.

In one embodiment, the event retrieving module 222 may retrieve a list of events from the event database 224 based on the context data. By way of example and not limitation, the event retrieving module 222 may retrieve the list of events based on the spatial information. For example, the event retrieving module 222 may retrieve an event having an associated location within a predetermined distance (e.g., within a physical distance such as 100 meters, within a same building shown the image or of the event shown in the image, within a same street, etc) from the location indicated in the spatial information of the context data.

Additionally or alternatively, the event retrieving module 222 may retrieve the list of events from the event database 224 based further on the temporal information. For example, the event retrieving module 222 may retrieve an event having an associated date and/or time within a predetermined time range (e.g., within 10 minutes, 30 minutes, 1 hour, etc.) from the date and/or time indicated in the temporal information of the context data.

In one embodiment, the event retrieving module 222 may rank the events in the list of events based on corresponding spatial distance and/or temporal distance from the spatial information and the temporal information indicated in the context data. For example, the event retrieving module 222 may rank an event having a location closer to the location indicated in the context data in a higher ranking position than an event having a location farther from the location indicated in the context data. Additionally or alternatively, the event retrieving module 222 may rank an event having a date and/or time closer to the date and/or time indicated in the context data in a higher ranking position than an event having a date and/or time farther from the date and/or time indicated in the context data. In other embodiments, the event retrieving module 222 may defer ranking the events in the list until an event type of the event shown in the image is determined.

In some embodiments, an image analysis module 226 may analyze the image before, substantially when, or after the context determination module 218 determines the context data and/or the event retrieving module 222 retrieves the list of events from the database 224. The image analysis module 226 may analyze the image by extracting image features from the image. The image analysis module 226 may employ one or more conventional feature extraction methods to extract the image features from the image. Examples of the feature extraction methods include, but are not limited to, edge detection, corner detection, blob detection, ridge detection, scale-invariant feature transformation, thresholding, blob extraction, template matching, Hough transform, attention guided color signature, color fingerprint, multi-layer rotation invariant EOH, histogram of gradients, Daubechies wavelet, facial features and/or black & white.

In one embodiment, the image analysis module 226 may perform a content analysis to determine a concept associated with the image. A concept may include an action (e.g., golfing), an object (e.g., a building such as Union Square) and/or a background scene (e.g., a landscape) shown in the image. The image analysis module 226 may determine a concept associated with the image based on the extracted image features. Additionally, the image analysis module 226 may determine a concept based further on a concept model 228. The concept model 228 may be trained based at least on labeled training data including labeled images, information of corresponding events and/or context data associated with the labeled images using a supervised training approach such as Support Vector Machine (SVM). Additionally or alternatively, an unsupervised training approach such as clustering approach may be used to train the concept model 228.

In response to determining a concept of the image, the image analysis module 226 may determine an event type of the image or the event shown in the image. In one embodiment, the image analysis module 226 may determine the event type of the image or the event shown in the image based on the determined concept. Additionally, the image analysis module 226 may determine the event type of the image or the event shown in the image based further on an event type model 230. The event type model 230 may be trained based at least on label training data including labeled concepts, labeled images and/or context data associated with the labeled images using a supervised training approach such as Support Vector machine (SVM). Additionally or alternatively, an unsupervised training approach such as clustering approach may be used to train the event type model 230.

In response to determining an event type of the image or the event shown in the image, a ranking module 232 may be used to rank the list of events retrieved from the event database 224 by the event retrieving module 222. In one embodiment, the ranking module 232 may rank the list of events based at least on the context data (e.g., the spatial information and temporal information) and/or the determined event type. In some embodiments, in response to ranking the list of events to obtain a ranked list of events, the ranking module 232 may send the ranked list of events to the client device 108 through the sending module 220.

Although the foregoing embodiments describe determining and/or retrieving a list of events from the event database 224 based on spatial information and temporal information associated with the image and a determined event type, the event determination system 106 may determine a list of events based on a subset of the spatial information, the temporal information and the determined event type. By way of example and not limitation, the event determination system 106 may determine a list of events based on the spatial information and the temporal information associated with the image, and return the list of events including events having spatial information and temporal information matching the spatial information and the temporal information associated with the image to the client device 108 for display to the user 102. For another example, the event determination system 106 may determine a list of events based on the spatial information associated with the image and the determined event type, and return the list of events including events occurring at or around a location indicated in the spatial information and having an event type matching the determined event type to the client device 108 for display to the user 102 irrespective of date and/or time, for example.

Example Event Database

For the sake of description, specific notations are described prior to describing the example event database 224 in details.

In one embodiment, a contextual photo or image may be defined as p=(img, time, location), where img is the image content of the photo of image p, and time and location=(latitude, longitude) correspond to the temporal information (e.g., timestamp) and spatial information (e.g., geo-coordinate) of the photo p. The time and the location may identify a unique spatio-temporal context under which the photo or image was created. A contextual photo or image p may be sent to the event determination system 106. Although the location is described as being represented in terms of latitude and longitude, the present disclosure is not limited thereto. Any description that may identify or approximate a location may be used. For example, a location may be represented by a name of a well-known building such as Eiffel Tower, a street address, an intersection of two streets, etc.

An event may be modeled as e=(time, location, title, description, type, media). In one embodiment, time=(start, end) may define a time interval during which e occurs. In some embodiment, location=(lat1, long1, lat2, long2) may represent, for example, coordinates of southwest and northeast corner of a place where e may take place. A name of the event e may be stored in title, and textual explanation of the event e may be saved in description. Event types, such as performances, exhibitions, sports, politics may be stored in type. Some events have media data, e.g. posters, photos and videos, which may be kept in media attribute.

Given an incoming contextual photo or image p, the event determination system 106 may determine events that are relevant to the photo or image p by computing a ranked list of events (e1, . . . , en), which, in one embodiment, are in decreasing order of likelihood that an event is the event at which the photo or image p was captured.

In one embodiment, the event database 224 may include two parts. One part may be built on a relational database management system (RDBMS) to store, for example, planned events that are extracted from information sources such as hosting websites. The other part may include a grid index structure. By way of example and not limitation, the event database 224 may partition a region (e.g., New York City) into a grid, with each cell of the grid corresponding to a sub-region (e.g., Brooklyn, Wall Street, etc.). For each sub-region, the event database 224 may store events detected in that sub-region into its corresponding cell. Table 1 below shows an algorithm for this event partitioning.

Given an input time and location of a photo or image p, a query with predicates specifying, for example, a spatial range and a temporal range, may be generated to search for relevant events as indicated in line 2 of Algorithm 1. In one embodiment, the query q may be submitted to a database of planned events, e.g., a database or table of planned events in the event database 224 (as indicated in line 3 of Algorithm 1). In some embodiments, if no event is returned from the database of planned events, the query q may be submitted to the grid structure of the event database 224 and checked whether any emergent event may currently be going on around p.location, as indicated in line 5 of Algorithm 1. The event database 224 may return a list of events E=(e1, e2, . . . , en). Alternatively, the query q may be submitted to both the database of planned events and the grid structure of the event database 224 at the same time.

TABLE 1

Algorithm 1: Query Event Database queryEDB

```
    Input: p.time, p.location
    Output: A list of events (e1, e2, . . . , en)
1   begin
2       q ← queryGeneration(p.time, p.location);
3       E1 ← queryPlannedEvents(q);
4       if E1 is NULL then
5           E1 ← queryEmergentEvents(q)
6       end
7       return E1
8   end
```

In one embodiment, in order to detect emergent events in a region, emergent event detection may be formulated as a first story detection (FSD) problem. By way of example and not limitation, information about a possible emergent event may be detected by analyzing blogs or micro-blogs in websites such as Twitter®. In one embodiment, the event determination system 106 may include an emergent event detection module 234. The emergent event detection module 234 may allocate an extra space for each event e to archive, for example, tweets that are detected to be related to an event. The archived tweets of an event e may be denoted as e.archivedTweets, for example.

In one embodiment, the emergent event detection module 234 may examine a tweet stream, for example, in one pass. For every incoming tweet t, the emergent event detection module 234 may compute a similarity value between the incoming tweet t and archived tweets of each previously detected event, and render a minimum of similarity values to be a novelty score of the incoming tweet t. In one embodiment, the emergent event detection module 234 may determine a similarity value between an incoming tweet t and an archived tweet of a previously detected event based on one or more similarity factors. Examples of similarity factors include, but are not limited to, detection of similar locations, detection of similar descriptions such as accident, and/or detection of similar times of posting the tweets, etc.

In some embodiments, if the novelty score of the incoming tweet t is greater than or equal to a first predetermined threshold, the emergent event detection module 234 may determine that the incoming tweet t may be the first tweet about a new event. In response to determining that the incoming tweet t corresponds to a new event, the emergent event detection module 234 may construct a new event e, and store a time, a location (e.g., geo-coordinate) and a text of the tweet t into e.time, e.location and e.title respectively, for example.

Alternatively, if the novelty score of the incoming tweet t is less than a second predetermined threshold, the emergent event detection module 234 may assign the incoming tweet t to an event e' which the similarity value for the incoming tweet t and the event e' is a maximum and add the incoming tweet t to e'.archivedTweets, for example. In one embodiment, the second predetermined threshold may be equal to the first predetermined threshold. In another embodiment, the second predetermined threshold may be less than the first predetermined threshold. In the latter case, the emergent event detection module 234 may defer to determine whether certain incoming tweet t corresponds to a new event or a previously detected event, given the existing archived tweets of previously detected events. The emergent event detection module 234 may wait for a predetermined period of time or a predetermined number of future tweets to be examined before the emergent event detection module 234 re-examines the incoming tweet t.

Additionally or alternatively, in order to improve a space and query efficiency, the emergent event detection module 234 may introduce a sliding time window w, e.g., a window with a length of 2 hours and a forward step of 10 minutes. In one embodiment, an event having a time outside the time window w may be removed. For example, at time T, the emergent event detection module 234 may keep events detected in a time window (T−2 hr, T]. After every 10 minutes, the emergent event detection module 234 may drop events that are detected during (T−2 hr, T−2 hr+10 min], and move the time window to (T−2 hr+10 min, T+10 min]. Using a time window may therefore save space usage that is bounded by an incoming data rate and a window size.

Additionally or alternatively, the emergent event detection module 234 may detect events in a finer granularity. For example, an event that is currently dominant in a street block, e.g., a fashion show, may be different from an event several blocks away, e.g., a car accident. In order to detect the latest events within a relevant area, the emergent event detection module 234 or the event database 224 may partition a region into a grid, and detect events from a sub-stream of each sub-region of the region independently. This partitioning can allow concurrent detection of emergent events at different locations or sub-regions, thereby making the emergent event detection more scalable. Therefore, when new tweets t arrive, the emergent event detection module 234 may route the tweets t to sub-streams associated with respective sub-region. The emergent event detection module 234 may then perform the above time window sliding and store the tweets t in corresponding cells of the grid. When a query q comes in, the emergent event detection module 234 may check a cell covering q.location and return one or more events stored in the cell. When the time window w moves, the emergent event detection module 234 may remove tweets outside the time window w and corresponding archived tweets.

Example Content Analysis and Ranking

In one embodiment, visual or image features of an image, such as color, shape, and texture, may be used in the process of event determination. For example, images showing a same event type may include certain common visual concepts. For example, images that are captured at festivals usually have "crowd" shown therein, and images of sports usually include "grassland." Furthermore, images or photos of different event types may include different visual concepts. By way of example and not limitation, images or photos capturing indoor events such as exhibition may not have outdoor concepts such as "street" and "buildings," but these outdoor concepts may be common in festival events. Based on these observation, certain relationship among images/photos, visual concepts and event types may exist.

In one embodiment, the event determination system 106 may further include an event type determination module 236. The concept determination module 236 may model the relationship between event types and raw visual/image features extracted from photos/images through a middle layer of visual concepts. For example, given an image, the event type determination module 236 may detect visual concepts, such as "crowd" and "grassland," based on image features of the image. The concept determination module 236 may then use these detected concepts to decide an event type of an event shown in the image.

In some embodiments, the event determination system 106 may further include two models: the concept model 228 and the event type model 230. The event type determination module 236 may employ the concept model 228 to detect visual concepts from raw image features. The event type determination module 236 may employ the event type model 230 to detect an event type based on existence of visual concepts in an image.

In one embodiment, the event type determination module 236 may employ a learning-based approach to perform a content-based analysis of the image. By way of example and not limitation, the event type determination module 236 may train the concept model 228 using a plurality of predetermined concepts and/or labeled images. For example, the event type determination module 236 may select a number of concepts from Large Scale Concept Ontology for Multimedia (LSCOM). The event type determination module 236 may obtain a plurality of images labeled with respective one or more concepts. For each concept, the event type determination module 236 may extract image features, e.g., low-level visual features including color, shape and texture, from the plurality of labeled images. In one embodiment, the event type determination module 236 may further normalize the extracted image features to fit each dimension of a feature space defined by the image features into a same range, e.g., [−1, 1]. This may allow the concept model 228 to weight each dimension, i.e., each image feature, equally. In another embodiment, the event type determination module 236 may normalize the extracted image features disproportionally to emphasize features such as shape more than other features such as color. The event type determination module 236 may then build the concept model 228 using a Support Vector Machine (SVM) model based on radial basis function (RBF) kernel, for example, by training the model 228 using the labeled images.

Upon obtaining the trained concept model 228, the event type determination module 236 may apply the concept model 228 to training images. In one embodiment, the event type determination module 236 may define a number of predetermined event types. The event type determination module 236 may then construct a training image set labeled with one or more concepts for each predetermined event type by matching results between the event database 224 and images posted on image websites such as Flickr®. In some embodiments, the event type determination module 236 may train the event type model 230 using the training image set for each predetermined event type.

In one embodiment, upon obtaining the trained event type model 230, the event type determination module 236 may apply the trained event type model 230 to the image to determine one or more concepts associated with the image or the event shown in the image.

In some embodiments, in response to determining an event type of the image or the event shown in the image, the ranking module 232 may rank the events retrieved from the event database 224 by the event retrieving module 222. In one embodiment, the ranking module 232 may take into account one or more ranking features. By way of example and not limitation, the one or more ranking features may include, but are not limited to, a spatial distance in relation to a location indicated in spatial information of context data associated with an image or an event shown in an image, a temporal distance in relation to a time indicated in temporal information of context data associated with an image or an event shown in an image, and/or an event type associated with an image or an event shown in an image.

In one embodiment, an event which location is closer to a location associated with the image (i.e., p.location or a location indicated in spatial information of context data) may be ranked in a higher position compared with other events which location is farther from the location associated with the image. In some embodiments, the spatial distance between a location of an event and a location associated with an image may be measured by a Euclidean distance therebetween.

Additionally or alternatively, an event which is going on at a time closer to a time associated with the image (e.g., p.time or a time indicated in temporal information of context data) may be ranked in a higher position compared with other events having times farther away from the time associated with the image. In other embodiments, a time of an event may be documented as a timestamp. In this case, an event having a start timestamp closer to the time associated with the image may be ranked in a higher position compared with other events having start timestamps farther away from the time associated with the image. In one embodiment, the temporal distance may be calculated as a time difference.

Additionally or alternatively, an event having an event type matching or closely matching the determined event type of the image or the event shown in the image may be ranked in a higher position compared with other events which are not.

In one embodiment, the ranking module 232 may rank the events based on a priority order or a linear weighted combination of the one or more ranking features such as spatial distance, temporal and/or event type. By way of example and not limitation, events may first be ordered by their spatial distances in relation to the location associated with the image (e.g., the location indicated in the spatial information of the context data such as p.location). For example, an event with the smallest spatial distance with p.location may be ranked at the top position or within a predetermined number of top positions. This is because events occurring nearby p.location may have a higher probability to be a target of the query of the user 102. Additionally or alternatively, the ranking module 232 may use exchangeable image file (EXIF) format based analysis to detect an object in focus, e.g. using a focal length, and decide how far an event may be.

Additionally or alternatively, among events that share a same spatial distance in relation to p.location, the ranking module 232 may rank events which time are closer to p.time in higher positions than events which time are farther away from p.time. It is because existence of concurrent events may make time differences to be less discriminative than spatial distances.

Additionally or alternatively, upon ranking events according to respective spatial and temporal distances in relation to the location and the time associated with the image, the ranking module 232 may rank the events based on respective event types and/or the determined event type of the image. In one embodiment, the ranking module 232 may determine that the determined event type of the image may match an event type of a majority of the events. In response to determining that the determined event type matches the majority event type, events of other event types may be pushed down to lower positions of the list in their current relative order compared with the events having the majority event type.

In another embodiment, the ranking module 232 may determine that the determined event type of the image may match an event type of a minority of the events. In response to determining that the determined event type matches the minority event type, the ranking module 232 may move one or more events of the minority event type to the top positions or higher positions compared with respective positions prior to moving.

In some embodiments, the ranking module 232 may determine that the determined event type of the image does not match any event type of the events. In response to determining that the determined event type of the image does not match any event type of the events, the ranking module 232 may keep the events in an original order. If an event such as an emergent event may not have associated event type information, the ranking module 232 may return information of the event directly to the client device 108 in its original ranking position.

Alternative Embodiments

Although the foregoing embodiments describe using an image to capture information of an event, the user 102 may additionally or alternatively use, for example, a microphone of the client device 108 to capture video, sound and/or speech related to an event. The client device 108 may send the video, sound and/or speech to the event determination system 106. Additionally, the client device 108 may further send context data associated with the event to the event determination system 106. The event determination system 106 may determine one or more events based on the received video, sound, speech and/or the context data associated with the event. By way of example and not limitation, the event determination system 106 may analyze the received video, sound and/or speech and determine an event type of the event captured in the received video, sound and/or speech. The event determination system 106 may then retrieve one or more events based on the context data and/or the determined event type as described in the foregoing embodiments.

In another embodiment, the event determination system 106 may further be used for real-time photo or picture annotation. In one embodiment, the described system 106 may detect a name of a person and/or a name of a place from an event description with a help of entity resolution, for example. The detected name of the person and/or the place may then be used to prune a search space and identify an object such as a building or a face. For example, the user 102 may see a celebrity on a premiere of a movie and may not know who he/she is. The user 102 may then take an image using the client device 108 and send the image to the described system 106. The described system 106 may determine who the celebrity is by analyzing the image and information of the movie (if the information of the movie is stored in a database accessible by the event determination system 106). Upon finding information of the celebrity, the described system 106 may send the information of the celebrity to the client device 108 for display to the user 102.

In other embodiments, the user 102 may use the event determination system 106 to determine any past, present, or future event in a specific location. By way of example and not limitation, the user 102 may use an image displayed in a search application, a photo application or the application 114 of the client device 108 or other device to obtain one or more events related to the specific location. Regardless of a location of the user 102 (i.e., whether the user 102 is positioned locally to or remotely from the specific location), the user 102 may send the image (with or without inputting a specific time, time range, date or data range) to the event determination system 106. Upon obtaining a list of events that are or will be held at the specific location, the event determination system 106 may then return the list of events to the client device 108. Therefore, the user 102 can obtain a list of events that have happened, are happening, or are scheduled to happen at the specific location without a need to manually search the Internet or get a brochure or the like to determine whether any event is or will be held at the specific location.

Additionally or alternatively, the event determination system 106 may further include other program data 238, such as query log data of event queries from one or more user 102. In some embodiments, the event determination system 106 may reuse results of previous queries stored in the query log data to serve as a new event query. In one embodiment, the event determination system 106 may determine that a new event query may have context data such as spatial and/or temporal information similar to a previous event query. For example, a spatial distance between indicated locations of the two event queries may be within a predetermined spatial threshold and a temporal distance between indicated times of the two event queries may be within a predetermined temporal threshold. The event determination system 106 may further determine that image features of an image included in the new event query are similar to images features of an image included in the previous event query, e.g. a similarity value between the two images being within a predetermined similarity threshold. In this case, the event determination system 106 may determine to return the previous list of events of the previous event query to the client device 108 of user 102 who submits the new event query.

Exemplary Methods

Figure 3:
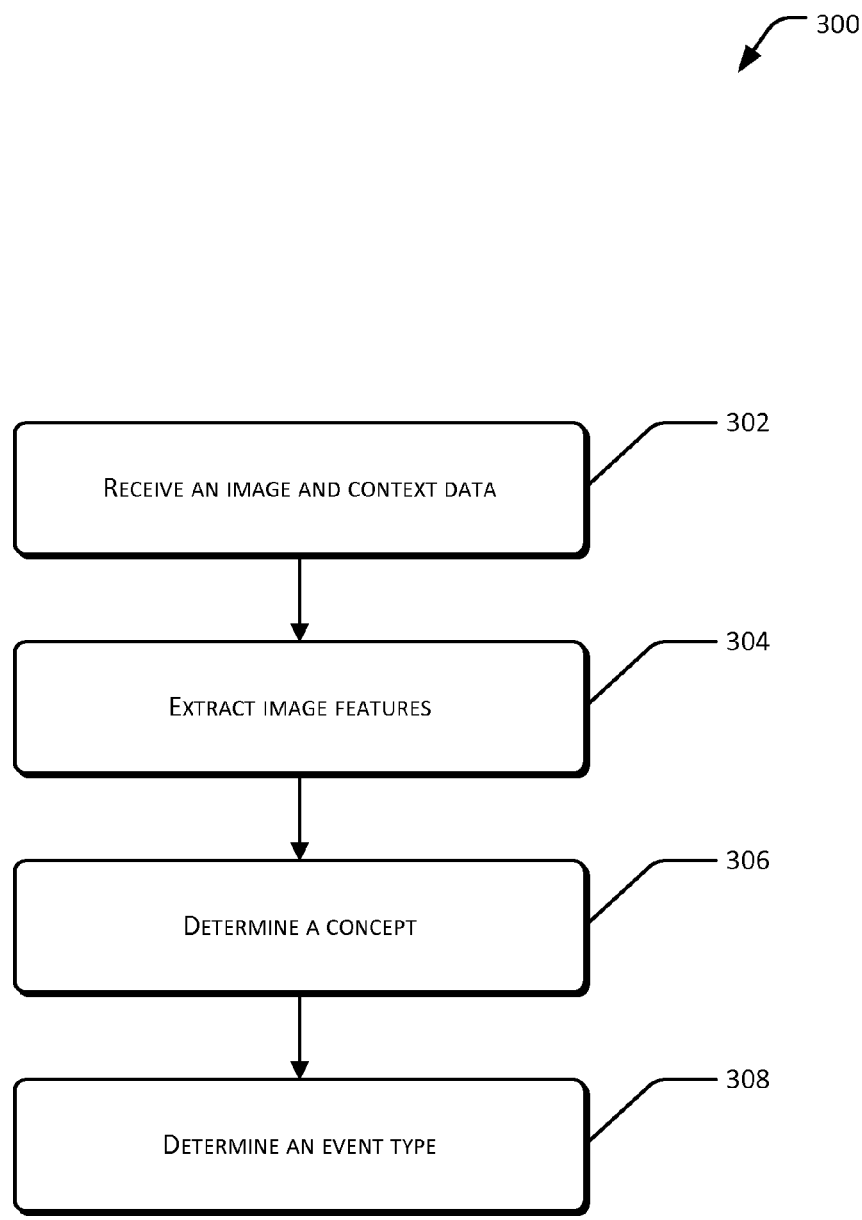
FIG. 3 illustrates an exemplary method of determining an event type of an event shown in an image.
Figure 4:
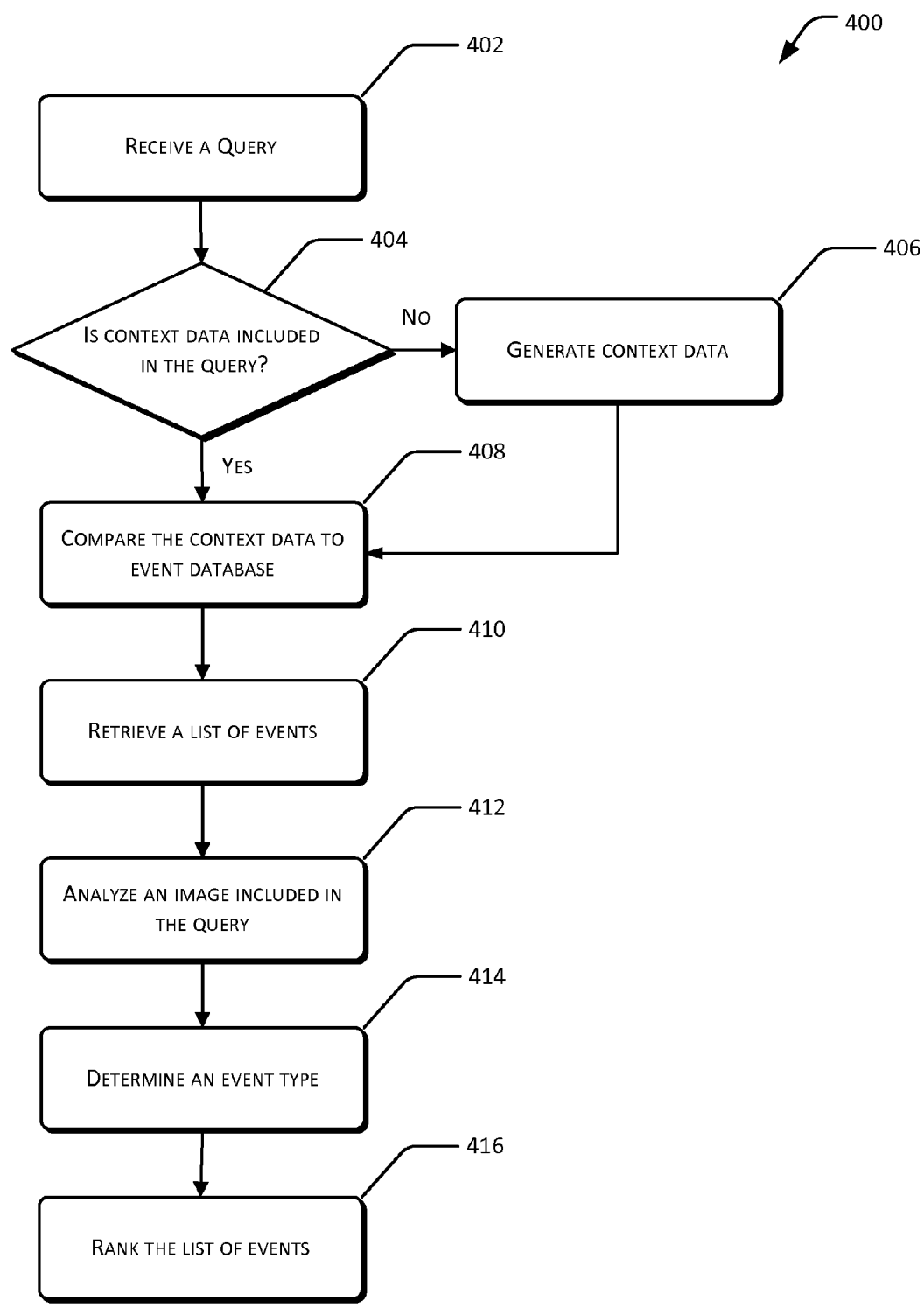
FIG. 4 illustrates an exemplary method of determining a list of events relevant to an event shown in an image.

Exemplary methods for are described with reference to FIGS. 3 and 4. The methods of FIGS. 3 and 4 may, but need not, be implemented in the environment of FIG. 1 and using the system of FIG. 2. For ease of explanation, FIGS. 3 and 4 are described with reference to FIGS. 1 and 2. However, the methods of FIGS. 3 and 4 may alternatively be implemented in other environments and/or using other systems.

These exemplary methods are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be omitted from the methods without departing from the spirit and scope of the subject matter described herein. In the context of software, the blocks represent computer instructions that, when executed by one or more processors, perform the recited operations.

FIG. 3 illustrates an exemplary method 300 of determining an event type of an event shown in an image.

At block 302, the event determination system 106 may receive an image, for example, from the client device 108 or the application 114 of the client device 108. In one embodiment, the event determination system 106 may receive the image in response to receiving a triggering action from the client device 108. The triggering action may include, but is not limited to, capturing an image or a scene using the client device 108, selecting an image from the application 114 of the client device 108, pointing the client device 108 to the scene without snapping an image of the scene.

In some embodiments, the event determination system 106 may receive the image with or without context data associated with the image. The context data associated with the image may include spatial information and temporal information associated with the image. In some embodiments, the spatial information may include a location at which the image is captured. The temporal information may include, for example, a time at which the image is captured. In other embodiments, the spatial information and the temporal information may include information of a location and a time inputted respectively by the user 102.

At block 304, the event determination system 106 may extract image features from the image. The event determination system 106 may extract image features from the image using any one or combination of conventional feature extraction methods.

At block 306, the event determination system 106 may determine a concept associated with image based at least on the extracted image features. In one embodiment, the concept may include an action, an object and/or a background scene shown in the image.

At block 308, the event determination system 106 may determine an event type of an event shown in the image based at least on the determined concept(s). Additionally, the event determination system 106 may retrieve a list of events, for example, from the event database, based on the context data associated with the image. The event determination system 106 may then refine the list of events to obtain a ranked list of events based on the determined event type and the context data. In some embodiment, in response to obtaining the ranked list of events, the event determination system 106 may return the ranked list of events to the client device 108 which may display the ranked list of events to the user 102.

FIG. 4 illustrates an exemplary method of determining a list of events relevant to an event shown in an image.

At block 402, the event determination system 106 may receive a query. The event determination system 106 may receive the query from the client device 108. In one embodiment, the query may include an image. Additionally, the query may further include context data associated with the image. The context data may include, but is not limited to, spatial information and/or temporal information associated with the image.

At block 404, the event determination system 106 may determine whether context data associated with the image (e.g., explicit contextual information of the image sent along with the image) is included in the query.

At block 406, in response to determining that context data associated with the image is not included in the query or only one of spatial information and temporal information associated with the image is present or included in the query, the event determination system 106 may determine and generate context data for the image. In one embodiment, the event determination system 106 may render the date and/or time of receiving the query to be temporal information associated with the image.

Additionally or alternatively, the event determination system 106 may perform object recognition to detect one or more objects in the image and determine, for example, whether a recognized object (e.g., Eiffel Tower) is present in the image. The event determination system 106 may then determine a location of the recognized object to be spatial information associated with the image.

Additionally or alternatively, the event determination system 106 may detect a name of a building, a name of a street, etc., through object recognition and may therefore use, for example, the name of the building or the name of the street, to determine spatial information associated with the image.

Additionally or alternatively, the event determination system 106 may determine spatial information associated with the image based on a location or an estimated location of the client device 108 in a cellular network (e.g., based on a cell tower to which the client device is connecting), based on connection to WiFi or other wireless networks, or the like.

At block 408, in response to determining that the context data (e.g., spatial information and temporal information) associated with the image is included in the query, the event determination system 106 may compare the context data to the event database 224. In one embodiment, the event database 224 may include scheduled events (e.g., festivals, sporting events, etc.) that are pre-scheduled ahead of time. Additionally or alternatively, the event database 224 may include emergent events (e.g., car accidents, earthquakes, etc.) that occur impromptu.

At block 410, in response to comparing the context data to the event database 224, the event determination system 106 may retrieve a list of events. In one embodiment, the retrieved list of events may include only events having associated spatial information (e.g., locations) that is within a predetermined distance from the spatial information associated with the image. Additionally or alternatively, the retrieved list of events may include only events having associated temporal information (e.g., date and/or time) that is within a predetermined time range before or after the temporal information associated with the image.

At block 412, the event determination system 106 may perform event content analysis of the image. In one embodiment, the event determination system 106 may extract visual or image features from the image, and determine a concept associated with the image or an event shown in the image based on the extracted visual or image features. Additionally or alternatively, the event determination system 106 may determine a concept associated with the image or an event shown in the image based on the concept model 228.

At block 414, the event determination system 106 may determine an event type associated with the image or the event shown in the image. In one embodiment, the event determination system 106 may determine an event type associated with the image or the event shown in the image based on the determined concept. Additionally or alternatively, the event determination system 106 may determine an event type associated with the image or the event shown in the image based on the event type model 230.

At block 416, in response to determining an event type associated with the image or the event shown in the image, the event determination system 106 may compare event types of the events retrieved at block 410 with the determined event type. In one embodiment, the event determination system 106 may rank and/or filter the list of events that is retrieved at block 410 based on the determined event type, the context data including, for example, the spatial information and/or the temporal information to obtain a refined list of events.

By way of example and not limitation, the event determination system 106 may rank a first event in the refined list at a position higher than a second event in the refined list in response to determining that the location (i.e., the spatial information) associated with the event shown in the image is closer to a location associated with the first event than a location associated with the second event.

Additionally or alternatively, the event determination system 106 may rank a first event in the second list at a position higher than a second event in the second list in response to determining that the time associated with the event shown in the image is closer to a time associated with the first event than a time associated with the second event.

Additionally or alternatively, the event determination system 106 may rank a first event in the refined list at a position higher than a second event in the refined list in response to determining that an event type of the first event matches the determined event type and an event type of the second event does not matches the determined event type.

In response to obtaining a refined list of events, the event determination system 106 may send the refined list of events to the client device 108 for display to the user 102. The user 102 may further refine the refined list of events by capturing a new image or pointing a (still or video) camera (not shown) of the client device 108 to a scene including the event the user 102 wants to know of without physically snapping an image thereof from a different direction/angle and/or a different zooming degree. The client device 108 may send a new query including the new image or a new view of the scene to the event determination system 106 which may refine the list of events using the new image or the new view of the scene and/or context data associated with the new image or the new view of the scene.

Optional to the foregoing blocks, the event determination system 106 may further determine a point of focus in the image. The event determination system 106 may determine a point of focus by examining an object at or substantially at the center of the image, for example. Additionally, the event determination system 106 may determine spatial information (such as a location) of the point of focus in the image based on the image and the context data. In one embodiment, the event determination system may then render the spatial information of the point of focus as spatial information associated with the image regardless of whether spatial information has been included in the context data. In some embodiments, the event determination system 106 may then retrieve a list of events and/or rank the list of events based on the spatial information of the point of focus of the image instead of the spatial information included in the context data or the query.

The foregoing blocks are described merely for illustrative purpose. An exemplary method in accordance with the present disclosure may omit one or more foregoing blocks. Furthermore, at least some of the foregoing blocks may be performed in parallel or in a different order. For example, the event determination system 106 may return a ranked or refined list of events to the client device 102 based on context data that is generated or determined by the event determination system 106 or that is sent along with an image without determining an event type for the image. The event determination system 106 may send all events that are located at a location indicated in the context data and occur at the location during a date and/or time indicated in the context data.

For another example, the event determination system 106 may receive a query including an image from the client device 108. The user 102 may intend to find events having an event type similar to or the same as an event type of an event shown in the image. The user 102 may want to find these events regardless of their locations and/or their dates and/or times of occurrence. In one embodiment, the user 102 may indicate his/her intent of so doing by inputting a command, for example, to the application 114. Additionally or alternatively, the event determination system 106 may the intent of the user 102 by noting that no context data associated with the image is received from the client device 108.

In response to determining that the user 102 intends to find events having an event type similar to or the same as an event type of an event shown in the image regardless of their locations and/or their dates and/or times of occurrence, the event determination system 106 may determine an event type of an event shown in the image and retrieve a list of events relevant to or matching with the event type from the event database 224, for example, based on the determined event type. The event determination system 106 may then return the retrieved list of events to the client device 108 for display to the user 102. This may allow the user 102 to plan he/she will go for vacation, for example, by obtaining information of the events having an event type that he/she wants to find or is interested in.

In response to receiving the list of events from the event determination system 106, the user 102 may determine spatial information (e.g., a location) and temporal information (e.g., a date and/or time) and send a new query including the spatial information and the temporal information (i.e., context data) and possibly, the previously sent image or a new image, to the event determination system 106. The event determination system 106 may then either refine the previously retrieved list of events using the log data stored in the other program data 238 or starting a new process for retrieving a list of events based on the new query for the user 102. In response to obtaining a new (ranked) list of events, the event determination system 106 may return the new list of events to the user 102 through the client device 108.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:
1. A computer-implemented method comprising:
under control of one or more processors configured with executable instructions:
receiving an image;
obtaining context data associated with the image, wherein the context data includes spatial data and/or temporal data associated with an event shown in the image;
comparing the context data to data in an event database to retrieve a first list of events;

analyzing the image to determine an event type of the event shown in the image; and comparing event types of the events in the first list with the determined event type to obtain a second list of events; and ranking a first event in the second list at a position higher than a second event in the second list in response to determining that a location associated with the event shown in the image is closer to a location associated with the first event than a location associated with the second event.

2. The computer-implemented method as recited in claim 1, wherein obtaining context data associated with the image includes receiving the context data along with the image in a query, or generating the context data based at least on content of the image.

3. The computer-implemented method as recited in claim 1, wherein the spatial data associated with the event shown in the image includes a location at which the image was captured, and the temporal data associated with the event shown in the image includes a time at which the image was captured.

4. The computer-implemented method as recited in claim 1, further comprising ranking a first event in the second list at a position higher than a second event in the second list in response to determining that the time associated with the event shown in the image is closer to a time associated with the first event than a time associated with the second event.

5. The computer-implemented method as recited in claim 1, further comprising ranking a first event in the second list at a position higher than a second event in the second list in response to determining that an event type of the first event matches the determined event type and an event type of the second event does not match the determined event type.

6. The computer-implemented method as recited in claim 1, further comprising returning the second list of events to a client from which the image is received.

7. The computer-implemented method as recited in claim 1, wherein the event database includes planned events and emergent events, the planned events including events that are pre-scheduled to occur and the emergent events including events for which occurrences are impromptu.

8. The computer-implemented method as recited in claim 1, further comprising:
determining a point of focus in the image; and
estimating a location of the point of focus based on the context data and the image.

9. The computer-implemented method as recited in claim 8, wherein comparing the context data to the data in the event database includes comparing the location of the point of focus to the event database to retrieve the first list of events, the events in the first list located within a predetermined distance from the location of the point of focus.

10. One or more computer-readable memory configured with computer-executable instructions that, when executed by one or more processors, configure the one or more processors to perform acts comprising:
receiving an image and context data associated with the image, the context data including spatial information and temporal information associated with the image, wherein the spatial information associated with the image includes a location at which the image was captured;
analyzing content of the image to detect an event type shown in the image;
retrieving a first list of events from an event database based on the spatial information and the temporal information associated with the image; and ranking the first list of events to obtain a ranked list of events based on at least a linear weighted combination of the detected event type of the image, the spatial information and the temporal information.

11. The one or more computer-readable storage media as recited in claim 10, wherein the temporal information associated with the image includes a date and/or time at which the image was captured.

12. The one or more computer-readable storage media as recited in claim 11, wherein retrieving the first list of events from an event database includes retrieving one or more events that occur within a predetermined distance from the location at which the image is captured and within a predetermined time range before and after the time at which the image is captured.

13. The one or more computer-readable storage media as recited in claim 10, wherein the acts further comprise:
determining a point of focus in the image; and
estimating a location of the point of focus based on the context data and the image.

14. The one or more computer-readable storage media as recited in claim 13, wherein retrieving the first list of events from an event database is further based on comparing the location of the point of focus to the event database to retrieve the first list of events, the events in the first list located within a predetermined distance from the location of the point of focus.

15. A computer-implemented method comprising:
under control of one or more processors configured with executable instructions:
receiving an image;
comparing context data associated with the image to an event database to retrieve a first list of events;
analyzing the image to determine an event type of an event shown in the image;
comparing event types of the events in the first list with the determined event type to obtain a second list of events;
ranking a first event in the second list at a position higher than a second event in the second list based at least in part on the context data;
receiving a second image; and
adjusting the ranking based on the second image.

16. The computer-implemented method as recited in claim 15, wherein the ranking is based at least in part on spatial data, associated with an event shown in the image, included in the context data.

17. The computer-implemented method as recited in claim 15, wherein the ranking is based at least in part on temporal data, associated with an event shown in the image, included in the context data.

18. The computer-implemented method as recited in claim 15, wherein the ranking is at least partially in response to determining that an event type of the first event matches the determined event type and an event type of the second event does not match the determined event type.

19. The computer-implemented method as recited in claim 15, further comprising requesting user confirmation of the context data.

20. The computer-implemented method as recited in claim 15, wherein the comparing context data to the event database to retrieve the first list of events includes retrieving one or more events that occur within a predetermined distance from the location at which the image is captured and within a predetermined time range before and after the time at which the image is captured.

* * * * *